June 13, 1961 A. D'ONOFRIO 2,988,194
AUTOMATIC TABULATING APPARATUS FOR TYPEWRITERS OR LIKE MACHINES
Filed June 10, 1959 3 Sheets-Sheet 1
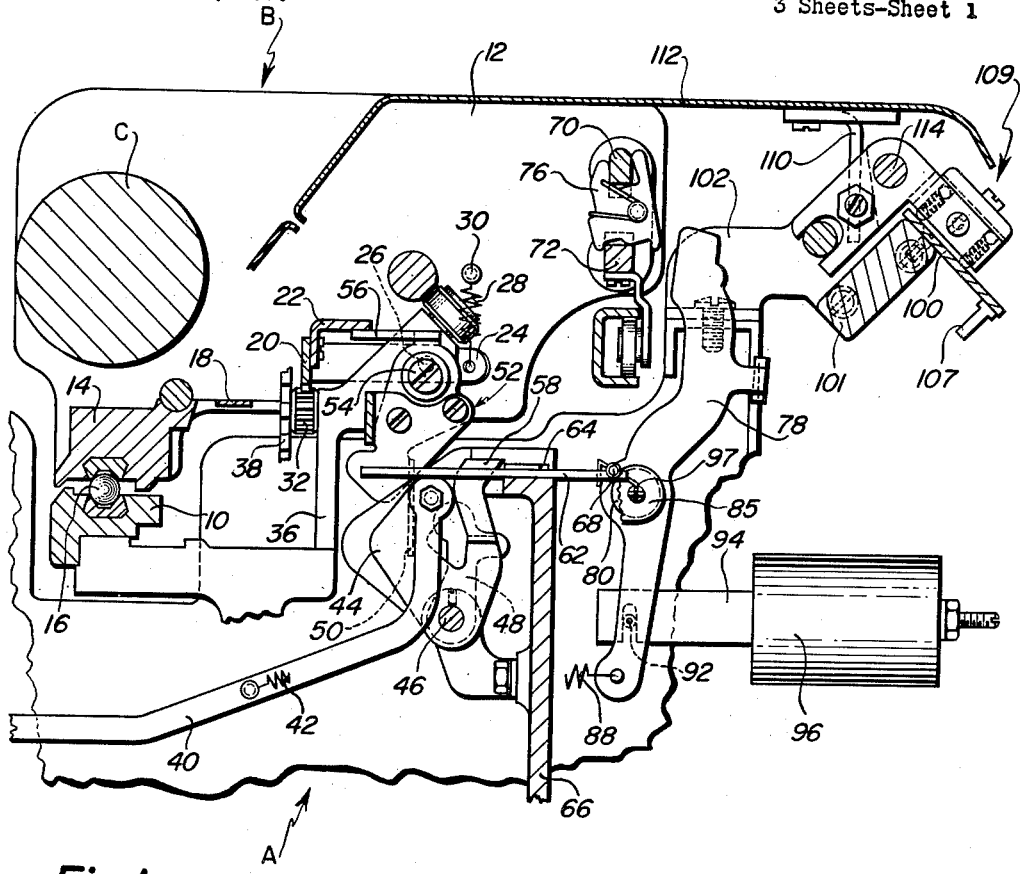
Fig_1
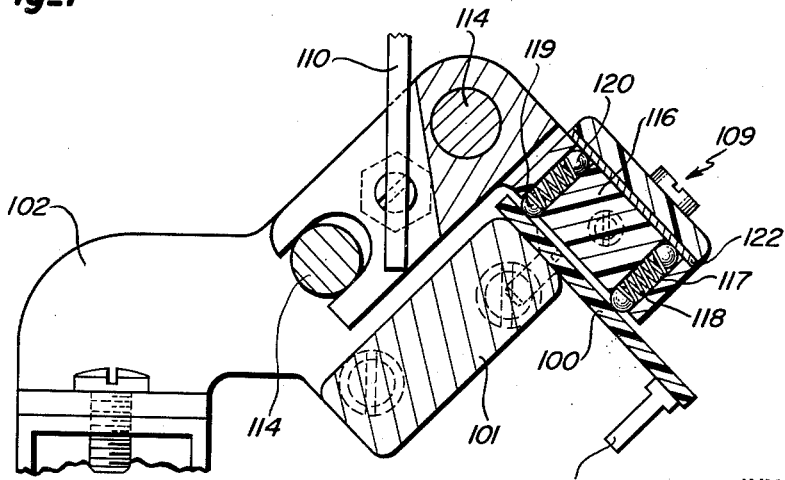
Fig_3
INVENTOR
ANTHONY D'ONOFRIO
BY Thomas S. Ross
Joseph R. Spalla
ATTORNEYS

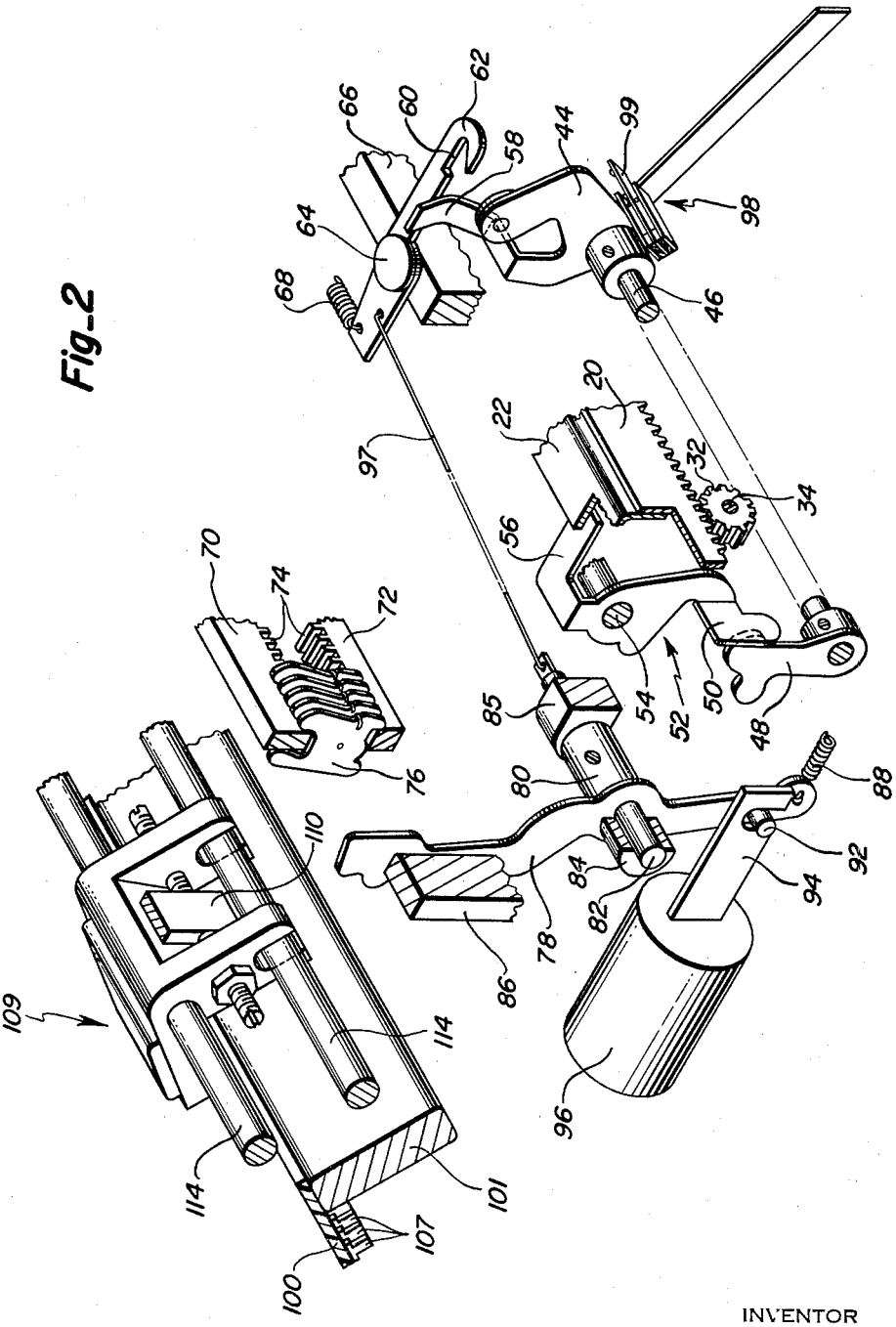

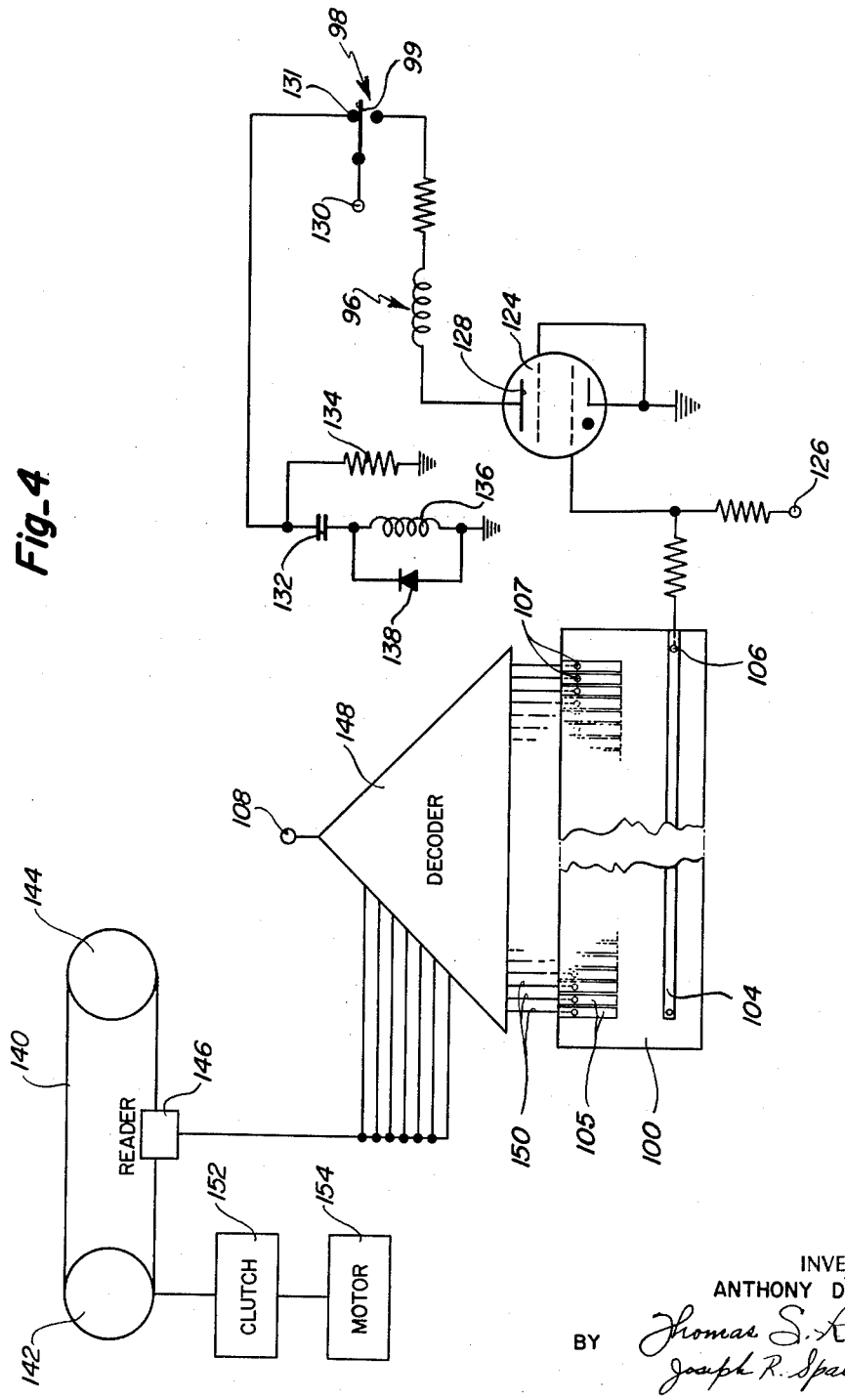

United States Patent Office 2,988,194
Patented June 13, 1961

---

2,988,194
AUTOMATIC TABULATING APPARATUS FOR TYPEWRITERS OR LIKE MACHINES
Anthony D'Onofrio, West Hartford, Conn., assignor to Royal McBee Corporation, Port Chester, N.Y., a corporation of New York
Filed June 10, 1959, Ser. No. 819,448
5 Claims. (Cl. 197—177)

This invention relates to automatic tabulating apparatus for typewriters or like machines; more particularly it relates to an automatic tabulating apparatus wherein the positioning of the carriage is under the control of a program device carrying tabular position data for one or a plurality of different forms of the type having the same line to line or different line to line formats; and specifically it relates to a programmed automatic tabulating apparatus wherein tabulating advance is arrested by an electrically actuated tabulation terminating interposer operable in response to signals selectively channelled by a program device to switch contacts arranged longitudinally of the carriage and effective upon movement of the typewriter carriage to the switch contact position selected by the program device.

Present day business practice involves the typing of information on forms which require the mechanical setting of an array of tabulation stops for limiting tabulating advance of the typewriter carriage at horizontally spaced zones. Since form formats differ, different forms of the type where the line to line format is the same or different, require an operator to mechanically reset all of the stops or, as disclosed in co-pending application S.N. 819,278, filed June 10, 1959, to change a program template or reset switches. Furthermore where the line to line format of a particular form is different, i.e. where successive lines on the form require stopping the carriage at different zone points, an operator must perform a tab operation through those zones which are not required for the particular line being typed but which may have been required for preceding lines or may be required for succeeding lines. Obviously this procedure, arising from the mechanical memory of the array of set tab stops or the electrical memory built into the programming arrangements disclosed in said co-pending application, is time consuming and therefore undesirable.

In accordance with the present invention, not only is the setting and resetting of tab stops, tab selector switches, or the changing of program template devices no longer required, but this invention permits an operator, whether the forms are of the type wherein every line has the same format, or forms of the type wherein every line has a different format, to simply depress a tab key to position the carriage to the proper zone and without having to tabulate through zones required in preceding or succeeding lines which occur before the desired zone in the line being typed.

In accordance with the present invention there is provided a typewriter wherein all of the tabular stops are permanently set and in the provision of a solenoid operated tabulation terminating device adapted to be interposed into the tabular stop rack to be engaged by one of the set stops. Since the line to line format may be different, switch contacts, connected in open circuits, are provided for every tab position. The open circuits associated with switch contacts corresponding to desired stopping positions are adapted to be closed only one at a time in accordance with position signals read from a program containing the desired format. Movement of the carriage in letter space direction sequentially bridges the switch contacts, and upon bridging switch contacts associated with a closed circuit, the solenoid for operating the tabulation terminating device is adapted to be energized.

As is evident from the above, depression of the tab key of the machine will cause the carriage to move in a letter space direction and to seek the position at which it is to be stopped. A feature of the invention resides in the fact that only one position at a time is effective to initiate stoppage of tabulating movement; the particular position being determined by a program device which is effective to select a new position after each tabulating operation. With this arrangement there is no built in memory so that no tabulation through zones in other lines which occur before zones desired in the line being typed is necessary.

An object of the invention therefore is the provision of an automatic tabulating apparatus wherein the positioning of the carriage is under control of a program device.

Another object of the invention is the provision of an automatic tabulation apparatus wherein carriage positioning is under control of a program device carrying position control data for one or a plurality of forms of the type having the same line to line or different line to line format.

Still another object of the invention is the provision of an automatic tabulating apparatus wherein only one tabulation terminating position over the entire length of travel of the carriage is effective and wherein a new tabulation termination position is automatically selected after each tabulating operation.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a cross-sectional view showing typewriter tabulating mechanism;

FIGURE 2 is a perspective view of parts of the tabulating mechanism;

FIGURE 3 is a cross-sectional view of a ball sensing device; and

FIGURE 4 is a schematic diagram of circuitry for controlling tabulating movement.

The typewriting mechanism shown by way of example as embodying the invention in a preferred form is generally similar in many respects to the Royal electric typewriter. As shown in FIGURE 1 it includes a main frame element A provided with a lower track or rail 10 on which a carriage element B including end plates 12 is mounted for letter spacing and return movements by means of a carriage or top rail 14 and ball rollers, one of which is shown at 16 in FIGURE 1. The carriage B is equipped with the usual cylinder or platen C. The carriage B is urged in a letter space direction by suitable means such as a spring drum which exerts a steady pull on a draw band 18 connected to the right hand carriage end plate. Movement of the carriage in letter spacing direction is controlled by escapement mechanism illustrated partially as including a rack 20 carried by an angle bar or rail 22 having rearwardly extending arms 24 pivotally mounted on the carriage at 26. Springs 28 connected to rearwardly extending portions of the arms 24 and anchored at 30 on the carriage, normally hold the escapement rack 20 in mesh with an escapement pinion 32 journalled on a shaft 34 (FIG. 2) carried by an escapement frame 36 secured to bottom rail 10. The pinion 32 is adapted to rotate with an escapement wheel 38 secured to shaft 34 during letter feed movement. The escapement wheel 38 is adapted to cooperate with escapement pawls or dogs (not shown) which are well understood in the art and which when actuated permit the wheel 38 and pinion to turn in step-by-step increments so as to permit the rack 20 and consequently the carriage to be fed in a letter space direction.

The tabulating mechanism for raising the carriage rack 20 to permit movement of the carriage, free of restraint by the escapement in a letter spacing direction, is partially illustrated in FIGURES 1 and 2, wherein is shown a tabular link 40 adapted to be actuated through connection with a driving element (not shown) which operates continuously. Controllable driving connections (not shown), which normally are inoperative or ineffective, but which may be conditioned by the operator by depression of a tabular key, effect operative driving connection between the continuously moving driving member and the tabulator link 40. Inasmuch as this action is well known suffice it to say that upon depression of the typewriter tabulator key, link 40 will be pulled forwardly or to the left as viewed in FIGURE 1 against the force of an associated return spring 42 suitably secured thereto and to the typewriter frame. Link 40 is pivotally connected to a lever arm 44 fast on a shaft 46 mounted in the typewriter frame, whereby, as link 40 moves forwardly, shaft 46 is rocked counterclockwise. Shaft 46 also has secured thereto a rack bar lifting lever 48 adapted to engage an ear 50 on and to rock clockwise a rack bar lifting arm generally designated 52 pivoted as at 54 on escapement frame 36 and having an upper arm 56 extending under the rack rail 22. When arm 52 rocks clockwise as viewed in FIGURE 1 the rack 20 is moved out of engagement with the escapement pinion thereby freeing the carriage for movement by the spring motor in letter space direction.

Lever arm 44 is also provided with an extension 58 adapted to be engaged by a slot 60 (FIGURE 2) formed in a latch member 62 pivoted at 64 on a bracket 66 secured to the typewriter frame. A spring 68 interposed between the rear end of latch member 62 and an ear (not shown) on the bracket urges latch member 62 to rock clockwise as viewed in FIGURE 2 so that when shaft 46 rocks counterclockwise, extension 58 will move forwardly until it reaches slot 60 whereupon spring 68 will pivot latch member clockwise latching lever arm 44 and shaft 46 in actuated position whereby the rack will be held out of engagement with the escapement pinion 32.

The tabulating mechanism also includes a support mounted on the carriage comprising upper and lower rack bars 70 and 72 respectively, formed with aligned transverse grooves 74 which are spaced longitudinally of the rack bars at letter space intervals. A plurality of tabular stops 76 are mounted in the grooves of the rack bars and all are mounted in and always remain in a set or operative position to engage a tabulation terminating interposer when the latter is in its operative position as will hereinafter appear. Such an arrangement constitutes a "solid" tab rack. In the form shown the tabulation terminating interposer is constituted by a tabular stop blade 78 having a boss 80 secured by a set screw for rotation with blade mounting means comprising a shaft 82 mounted for both axial and rocking movement in bearing lugs 84 and 85 on a bracket 86. The tabular stop blade is normally biased out of engagement of the tab rack by a spring 88 suitably secured thereto and to the typewriter frame. The tabular stop blade 78 is adapted to be moved into the path of a tabular stop 76 through connection as at 92 with the armature 94 of a solenoid 96 mounted on the typewriter frame. The tabulation terminating interposer or tabular stop blade is also connected by a link 97 most clearly seen in FIGURE 2 to actuate the latch member 62 to permit the rack to re-engage the escapement pinion as will hereinafter be more fully explained. In the normal position of the parts the tabular stop blade abuts bracket 86 and boss 80 is axially spaced from bearing lug 85; spring 68 being ineffective to move blade 78 axially to the right through link 97 because of the abutment of extension 58 with latch member 62.

The above arrangement of parts differs from the Royal electric typewriter in that a solid tab rack is provided and the tabular stop blade is solenoid actuated rather than being linked to rock shaft 46.

Further in accordance with the invention a form C tab latch switch 98 is suitably mounted on the typewriter frame and its movable contact 99 is disposed so as to be moved from its normally closed position by movement of latch lever 44 to actuated/latched position.

In accordance with the invention a longitudinally disposed program plate 100 is secured to a bar 101 which is secured at either end to brackets 102 fixed on the typewriter frame. The program plate 100 preferably carries printed circuitry as seen in FIGURE 4 comprising a common longitudinally disposed conductor 104 and a plurality of individual printed conductors 105 spaced at letter space intervals. The common conductor 104 is connected to a terminal 106 riveted to the plate 100 as are each of the individual conductors to terminals 107. The individual conductors are adapted through terminals 107 to be selectively connected only one at a time to a power supply 108 as will hereinafter be described. A ball sensing device generally designated by 109, which functions as a movable switch contact, is mounted for movement with the carriage by an arm 110 secured to and depending from the carriage top plate 112 and is guided on frame mounted rails 114. The ball sensing device is adapted to sense the individual conductor 105 which is connected to power supply 108.

As seen in FIGURE 3 the sensing device comprises an insulating block 116 having spaced bores 117 wherein are disposed springs 118 adapted to bias balls 119 and 120 at either end respectively, against the printed circuit plate and a contact plate 122. The spacing of the bores in such that balls 119 will bridge the common conductor 104 and successive individual conductors 105 as the carriage moves in letter space direction. The common conductor 104 is connected to the grid of a thyratron 124 (FIGURE 4) which is normally biased below its firing potential through connection to a bias supply 126. The plate 128 of the thyratron is adapted to be connected to a plate voltage supply 130 through the tab blade control solenoid 96 and the normally open contacts of the tab latch switch 98. The stationary contact 131 of the tab latch switch is connected to one side of a condenser 132 and to ground through a resistor 134. The other side of the condenser is connected to ground through a clutch control solenoid 136 which is shunted by a diode 138 poled to pass the condenser discharge current and to present a high impedance to the charge current.

Referring now more particularly to FIGURE 4 there is shown an endless program tape 140 mounted on and between a feed roll 142 and an idler roll 144 for incremental, aperiodic movement past a tape reading device 146. As will be understood by persons conversant with the art the tape 140 carries tabular position control information in binary coded form; a six level coded tape being illustrated. The control information is preferably perforated in the tape and a suitable perforated tape reading device 146 employed. The signals read from the tape 140 are translated in a decoder 148, many of which are well known, thereby to selectively set up in accordance with the particular code sensed, discrete current paths between power source 108 and one of the 64 output terminals 150 of the decoder. The output terminals 150 of the decoder are connected to the individual printed circuit conductors 105 through terminals 107 on the printed circuit plate. As described above the carriage may be tabulated to 64 different positions. If more are required a seven, eight or more level tape and a seven or eight level decoder could be employed with a printed circuit plate having a corresponding number of conductors 105.

The clutch control solenoid 136 is associated with a suitable clutch 152 such as a well known wrap spring clutch whereby when energized a motor 154 will be connected to drive feed roll 142 through one increment and tape 140 columnwise one column whereby reading head 146 will sense the next code and reset the translator circuits to connect a different output terminal 150 to the power source 108.

In operation, and with power on, the code sensed from the program tape 140 will effect circuit connections between power source 108 and one of conductors 105; condenser 132 having been charged through contacts 99 and 131 of switch 98 thereby pulsing solenoid 136. When a tabulating operation is initiated, link 40 will rock shaft 46 as heretofore explained. This will cause rack 22 to be lifted from the escapement pinion, extension 58 of latch lever 44 to engage the slot 60 in latch member 62, whereby the rack will be held out of engagement with the escapement pinion, tabular stop blade to move axially to the right into abutment with bearing lug 85 under the action of spring 68, and the tab switch 98 to move contact 99 to its other position thereby discharging condenser 132 through resistor 134 and diode 138 and connecting plate supply voltage to thyratron 124 conditioning it for firing upon receipt of a signal on its grid. The carriage will therefore move until the ball reader thereon bridges the common conductor 104 and the conductor 105 connected to power source 108 through a translator path determined by the code sensed; whereupon the grid of the thyratron 124 will rise above the tube firing potential. The thyratron will fire and the tab lever control solenoid 96 will be energized. Energization of the solenoid will move the tabular stop blade 78 into the tab rack between tab stops 76 and immediately before the tab stop 76 corresponding to the zone position on the form to which carriage movement was desired as determined by the program tape code sensed. The tab stop will engage the tabular stop blade 78, moving it against bracket 86 thereby arresting movement of the carriage. Movement of the tabular stop blade to the left as viewed in FIGURE 2 will cause link 97 to pull latch member 62 thereby unlatching lever arm 44 and rack bar lifting lever 52 whereupon the rack 20 re-engages the escapement pinion 32, switch 98 assumes its normally closed position thereby de-energizing solenoid 96 and the tab lever 78 moves out of the tab rack. Movement of contact 99 of the tab latch switch back to stationary contact 131 causes condenser 132 to recharge through the clutch control solenoid 136 thereby moving the program tape 140 one column whereby the decoder will reset in accordance with the code sensed and another contact 105 will be connected to power source 108 after the arrest of tabulating advance.

It is to be understood that the program tape may be of any length, e.g. a continuous record tape fed from a storage roll. Such rolls may be associated with rewind mechanism and skip forward or program selector mechanism if skipping over a program in the tape is desired.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a typewriter having a frame, and a carriage movable on said frame, apparatus for controlling tabulating advance of said carriage to predetermined horizontal positions relative to the printing station of said typewriter, comprising a solenoid, a solenoid control circuit, switch means for conditioning said control circuit during tabulating advance of said carriage, a plurality of contacts spaced at letter space intervals, a common contact connected to said control circuit, means for successively connecting said spaced contacts to said common contact, said contacts and said means being one on the frame and one on the carriage of said typewriter, a power source, means for selectively connecting one of said spaced contacts to said power source whereby when said one contact is connected to said common contact said solenoid is energized, means responsive to energization of said solenoid for arresting tabulating advance of said carriage, and means responsive to the arrest of tabulating advance for controlling said connecting means whereby another one of said spaced contacts is connected to said power source.

2. In a business machine having a movable carriage, a plurality of tabular stops, and a tabular blade adapted for cooperation with said stops to arrest tabulating advance of said carriage, apparatus for controlling tabulating advance of said carriage to predetermined horizontal positions relative to the printing point of said machine, comprising means for releasing said carriage for tabulating advance, a solenoid for enabling cooperation between said tabular blade and said tabular stops when energized, a control circuit for energizing said solenoid, switch means responsive to the release of said carriage for conditioning said control circuit, a plurality of contacts spaced at tab stop intervals, a common contact connected to said control circuit, means on said carriage for successively connecting said spaced contacts to said common contact, a power source, means for selectively connecting said power source to one of said spaced contacts whereby when said one contact is connected to said common contact said solenoid is energized, and means responsive to the arrest of tabulating advance for controlling said connecting means whereby another one of said plurality of contacts is connected to said power source.

3. In a business machine having a frame, a carriage mounted for movement on said frame in letter space and return directions, a tabulating mechanism operable to release said carriage for unrestricted movement in letter space direction, a tabular stop blade, a plurality of tabular stops adapted to engage said tabular stop blade when in its operative position, a solenoid for actuating said tabular stop blade to operative position when energized, a control circuit conditioned during tabulating advance for energizing said solenoid, a plurality of contacts, means for successively connecting said contacts to said control circuit during tabulating advance of said carriage, a power source, a coded program record, means for sensing said record, a code translator having its output terminals connected to said plurality of contacts and responsive to said record sensing means for selectively connecting said power source to one of said contacts whereby said conditioned control circuit energizes said solenoid, and means responsive to the arrest of tabulating advance for indexing said record.

4. In a business machine having a frame, a carriage mounted for movement on said frame in tabulating and return directions, tabulating mechanism for initiating tabulating movement, a tabular stop blade normally in an inoperative position, a plurality of tabular stops adapted to engage said tabular stop blade when in its operative position, a solenoid adapted when energized to actuate said tabular stop blade to its operative position, a control circuit for energizing said solenoid, means responsive to the initiation of tabulating movement for conditioning said control circuit during tabulating movement, a plurality of contacts spaced at tabular stop intervals, means for successively connecting said contacts to said control circuit during tabulating movement of said carriage, a signal source, means for selectively connecting said signal source to one of said contacts, said conditioned control circuit being activated upon connection to said selected contact thereby energizing said solenoid and arresting tabulating movement, and means responsive to the arrest of tabulating movement for controlling said connecting means.

5. In a typewriter having a frame, and a carriage movable on said frame, apparatus for controlling tabulating advance of said carriage to predetermined horizontal positions relative to the printing station of said typewriter, comprising a solenoid, a solenoid control circuit, switch means for conditioning said control circuit during tabulating advance of said carriage, a plurality of contacts spaced at letter space intervals, a common contact connected to said control circuit, means for successively connecting said spaced contacts to said common contact, said contacts and said means being one on the frame and one on the carriage of said typewriter, a power source, a coded program record, means for sensing said record, a code translator having its output terminals connected to said spaced contacts and responsive to signals sensed from said record for selectively connecting said power source to one of said spaced contacts whereby when the selected contact is connected to said common contact said solenoid is energized, means responsive to energization of said solenoid for arresting tabulating advance of said carriage, and means responsive to the arrest of tabulating advance for indexing said record.

References Cited in the file of this patent

UNITED STATES PATENTS

| | | |
|---|---|---|
| 2,255,011 | Lake et al. | Sept. 2, 1941 |
| 2,902,137 | Toeppen | Sept. 1, 1959 |